Patented Sept. 1, 1936

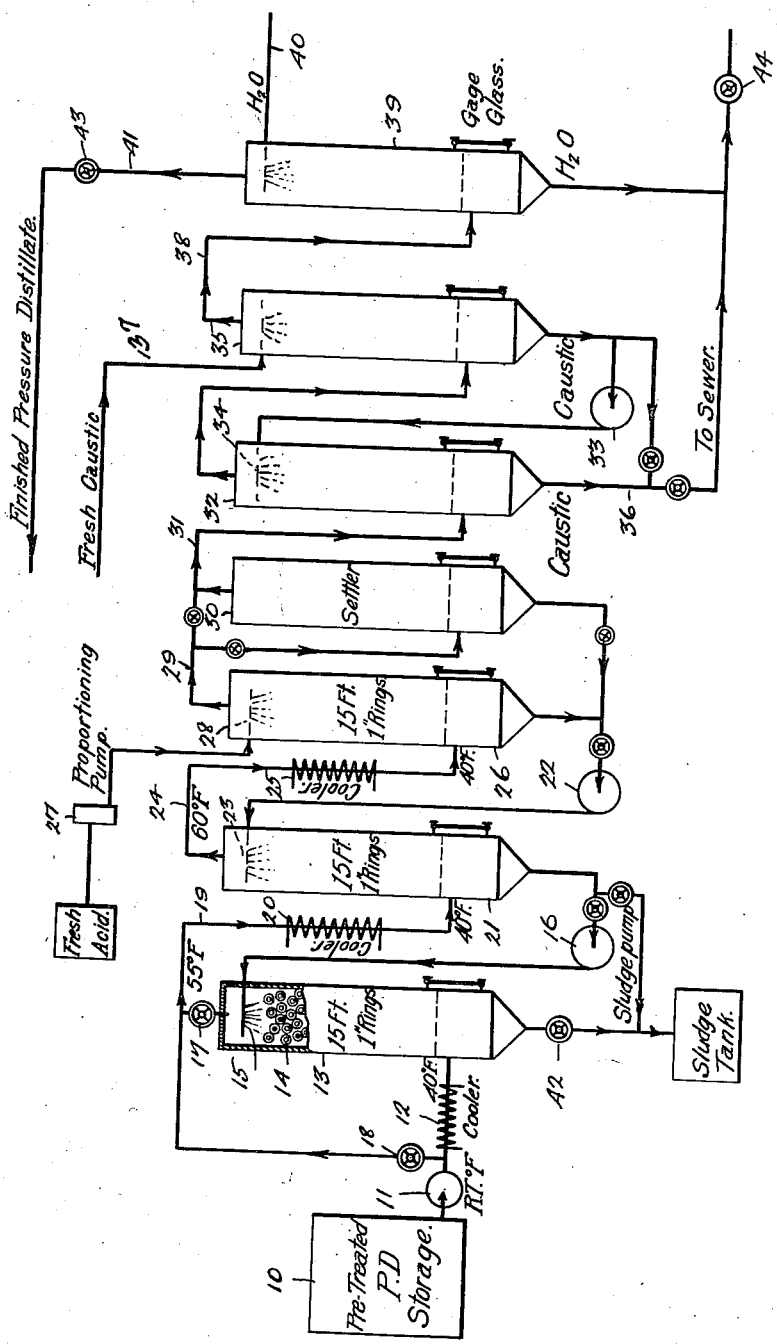

2,052,852

UNITED STATES PATENT OFFICE 2,052,852

ACID TREATMENT OF OILS

David Dewey Stark, Berkeley, and Thomas Oliver Edwards, Jr., Associated, Calif., assignors to Associated Oil Company, San Francisco, Calif., a corporation of California Application April 22, 1931, Serial No. 532,000
Renewed June 10, 1935

10 Claims. (Cl. 196—31)

This invention relates to the acid treatment of oils and has for its principal object the efficient utilization of acid for the removal of impurities from hydrocarbon distillates, or fractions.

In the treatment of oils of high sulphur content, such as a pressure distillate made by cracking high sulphur residuums or gas oils, the removal of sulphur compounds requires large quantities of sulphuric acid (66° Baumé or stronger).

We have found that acid sludge, resulting from the treatment of oil with fresh acid, when used as a reagent for the removal of sulphur compounds has a selective affinity therefor similar to fresh acid. This results in a large saving of fresh acid in the treatment of oils by a series of steps for removing sulphur compounds first from a distillate by the use of acid sludge prior to contacting the thus treated distillate with fresh acid, the acid sludge used in the first step being derived from a succeeding step.

In order to utilize the acid sludge and fresh acid to the greatest possible extent, a counter-current system of contacting an oil with acid reagents is best adapted for the process in combination with the use of contact material, such as Raschig rings, for contacting, coagulating, and settling of the acid sludge from the oil.

We have found that by at least twice using the acid sludge resulting from the treatment of a pressure distillate with fifteen pounds of 66° sulphuric acid per barrel, that the oil after redistillation has the same sulphur content as if it had been treated with about 20 pounds, or more, per barrel of fresh acid in a batch treatment.

It is quite evident that the governing factor in the treatment of pressure distillate with acid sludge is the number of stages of application, hence the optimum effect can be obtained by a truly counter-current acid treating system which represents sludge treatment in a plurality of stages. Treating with the same rate of fresh acid in a two or three stage circulatory system provides a finished gasoline after redistillation having appreciably more sulphur content than a gasoline from pressure distillate treated by a counter-current system and redistilled.

In our treatment of distillates requiring the use of 66° sulphuric acid, or stronger, in order to prevent chemical reactivity with unsaturated hydrocarbons and to counteract exothermic chemical reactions, we control the temperatures throughout the process by refrigerating the oil and acid mixtures and providing a temperature therefor of from 40° F. to 20° F., or less. Such cold treatment aids in the reduction of the sulphur content because it permits the reaction of a larger percentage of the sulphuric acid with sulphur compounds present in the distillate.

A form of our process is illustrated in the diagrammatic sheet of drawings wherein an oil, such as a pressure distillate, is taken from storage 10 and forced by pump 11 at any particular temperature through a cooler 12 into the bottom of a third contact chamber 13. Said chamber 13 is partly filled with contact material 14, preferably in the form of Raschig rings about one inch diameter, which extend from the lower broken lines up to a point in the chamber where the upper surfaces will be exposed to the action of an acid spray 15 supplied with acid sludge by a pump 16 from the bottom of a second contact chamber 21.

Valves 17 and 18 are provided to by-pass chamber 13, or the acid treated oil therefrom is supplied through a line 19 and cooler 20 to the lower part of a second contact chamber 21 which is similarly constructed to chamber 13 for the purpose of treating the cooled oil with acid sludge supplied from the bottom of a first contact chamber 26 by a pump 22 through an acid spray 23, the treated oil passing through a line 24 and cooler 25 to the lower portion of chamber 26.

In chamber 26, the oil which has been treated once or more with acid sludge for the removal of sulphur compounds is contacted with fresh acid supplied by a pump 27 through a spray 28 and the treated oil passes through a line 29 to the lower part of a settling chamber 30 passing upwardly therein through contact material whereby the acid sludge particles are coagulated and settled out to be supplied to pump 22, as indicated in our copending application, Serial Number 489,870, filed October 20, 1930. While chamber 30 is desirable as a safety factor, yet it may be by-passed, as by proper handling the same quantity of acid sludge may be coagulated and removed in chambers 21 and 26.

The treated oil, distillate, passes from settling chamber 30 and contains substantially no acid and then flows through a line 31 to the lower part of a contact chamber 32 wherein it meets a counter-current flow of caustic solution supplied through a pump 33 and spray 34 from the bottom of contact chamber 35, any spent caustic with contained impurities being passed through a line 36 to be wasted, or other uses.

In chamber 35, the oil is contacted with fresh caustic solution supplied through a line 37 and the neutralized oil then flows through a line 38 to the lower part of a wash chamber 39 wherein it is washed with water from a line 40 and the finished distillate is passed to storage, or use, through a line 41.

All the chambers 13, 21, 26, 30, 32, 35, and 39 may be of equal size and all except 39 may be filled with contact material as described, but all the acid chambers 13, 21, and 26 must be filled with such contact material.

Heretofore, the principal objection to continuous treating systems has been the inability to insure uniform distribution of the treating medium over a cross section of the contacting vessel, but the success of such system depends partly on the construction of apparatus for bringing the material to be treated in uniform contact with the treating medium of increasing strength, or concentration.

In the present system, this is accomplished by giving pump 16 a greater capacity than required for the sludge alone from chamber 21 whereby an internal circulating path of sludge and oil is set up through spray 15 (which may be a well known type of diffusion ring), chamber 13, pipe 19, cooler 20, chamber 21, and pump 16. Such internal circulation gives a constant ratio of acid sludge to oil, the excess sludge coagulating and settling out uniformly over the cross section of contact material under spray 15 where it settles downwardly becoming more spent in contacting oil of increasing impurity.

Additionally, pump 22 is part of a similar circulating system and other units may be added if desired. Such described internal circulating systems have the added advantages of increasing the heat exchange efficiency of the coolers over a wider range of treating plant capacities and insure intimacy of contact between the oil and treating agent at these points.

The contacting is accomplished by mechanical mixing (as in the pumps) and by surface contacting, a proper velocity of oil being maintained through the contact material to assure coagulation, settling and removal of the acid sludge, while the internal circulation gives increased cooling efficiency by increasing the velocity of the oil through the coolers.

Regulation of the pressure on the system is accomplished by manipulation of valves 42, 43, and 44.

The whole system described comprises a counter-current treatment for a continuous flow of distillate whereby a plurality of stages of treatment with acid sludge insures a removal of sulphur compounds with a minimum content of fresh acid, and in which at least two stages of internal circulation are desirable to provide intimate contact of the materials at all times partly through the medium of even distribution of the acid reagent over the contact material and by means of the material itself.

However, with the system described, a similar counter-current flow, either in single or multiple tower arrangement, may give sufficient contacting to produce the maximum desulphurization at a point where the acid sludge is just fluid enough at the temperatures employed to flow under a small pressure head. In this manner a maximum use of the acid sludge is procured in a counter-current system.

The temperatures employed may be such as are indicated in the drawing in which the oil entering the chamber 13 may be about 40° F. and may leave said chamber at about 55° F. and so on, but we do not limit ourselves to any particular temperature, as in some instances it may be desirable to cool and treat the oil at a temperature as low as 20° F.

Likewise, it is advisable to maintain pressure on the system to prevent excess gasification on account of the reaction of oil and acid producing quantities of sulphur dioxide. By maintaining a gage pressure up to 100 pounds per square inch (preferably from 50 to 60 pounds) at a temperature of 40° to 50° F., the $SO_2$ will be maintained in liquid phase, which assures a minimum formation of gas which otherwise might increase the velocity of the distillate to such a point as to prevent coagulation and settling of the acid sludge.

We claim as our invention:

1. A process of treating oil which comprises: continuously passing a stream of hydrocarbon oil through a plurality of chambers in series containing contact material and continuously passing sulphuric acid and acid-sludge in counter-current flow to said oil, removing a substantially acid free oil from the last chamber in the series; the acid-sludge being passed continuously with part of the oil from the lower portion of one chamber to the upper portion of a preceding chamber wherein the acid sludge separates from the accompanying oil to be sprayed on and descend by gravity through the contact material in said chamber, and the entire system being held under a superatmospheric pressure of from 50 to 60 pounds per square inch.

2. A process of treating oil which comprises: continuously passing a stream of hydrocarbon oil through a plurality of chambers in series containing contact material and continuously passing sulphuric acid and acid-sludge in counter-current flow to said oil, removing a substantially acid free oil from the last chamber in the series; the acid-sludge being passed continuously with part of the oil from the lower portion of one chamber to the upper portion of a preceding chamber wherein the acid-sludge separates from the accompanying oil to be sprayed on and descend by gravity through the contact material in said chamber, and the entire system being held under a superatmospheric pressure sufficient to hold $SO_2$ in liquid form at the operating temperature.

3. A process of refining oil which comprises: continuously passing a stream of hydrocarbon oil through a plurality of chambers in series containing contact material and continuously passing sulphuric acid and acid-sludge therethrough in counter-current flow to said oil, the volume of said stream of oil being increased in its passage from the upper part of one chamber to the lower part of a succeeding chamber, wherein the oil flows upwardly through the contact material while meeting a downward flow of acid and acid sludge, by the addition of a portion of the oil carrying acid sludge passed from the lower part of said succeeding chamber to the upper part of said first chamber wherein said acid sludge separates from said carrying oil to descend by gravity through the contact material in said first chamber.

4. A process of refining oil which comprises: continuously passing a stream of hydrocarbon oil through a plurality of chambers in series containing contact material and continuously passing sulphuric acid and acid-sludge therethrough in counter-current flow to said oil, the volume of said stream of oil being increased in its passage from the upper part of one chamber to the lower part of a succeeding chamber, wherein the oil flows upwardly through the contact material while meeting a downward flow of acid and acid sludge, by the addition of a portion of the oil carrying acid-sludge passed from the lower part of said succeeding chamber to the upper part of said first chamber wherein said acid-sludge separates from said carrying oil to descend by gravity through the contact material in said first chamber, and the temperature of said increased stream being reduced by cooling intermediate said chambers to a degree sufficient to cause increased selective reaction of the acid sludge with sulphur compounds in the oil.

5. A process of refining oil which comprises: continuously passing a stream of hydrocarbon oil through a plurality of chambers in series containing contact material and continuously passing sulphuric acid and acid-sludge therethrough in counter-current flow to said oil, the volume of said stream of oil being increased in its passage from the upper part of one chamber to the lower part of a succeeding chamber, wherein the oil flows upwardly through the contact material while meeting a downward flow of acid and acid sludge, by the addition of a portion of the oil carrying acid-sludge passed from the lower part of said succeeding chamber to the upper part of said first chamber wherein said acid-sludge separates from said carrying oil to descend by gravity through the contact material in said first chamber, and the temperature of said increased stream being reduced by cooling intermediate said chambers to about between 20° F. and 40° F.

6. A process of refining oil which comprises: continuously passing a stream of hydrocarbon oil through a plurality of chambers in series containing contact material and continuously passing sulphuric acid and acid-sludge therethrough in counter-current flow to said oil, the volume of said stream of oil being increased in its passage from the upper part of one chamber to the lower part of a succeeding chamber, wherein the oil flows upwardly through the contact material while meeting downward flow of acid and acid sludge, by the addition of a portion of the oil carrying acid-sludge passed from the lower part of said succeeding chamber to the upper part of said first chamber wherein said acid-sludge separates from said carrying oil to descend by gravity through the contact material in said first chamber and the entire system being held under a superatmospheric pressure sufficient to hold $SO_2$ in liquid form at the operating temperature.

7. A process of refining oil which comprises: continuously passing a stream of cracked gasoline through a plurality of chambers in series containing contact material and continuously passing sulphuric acid and acid sludge therethrough in counter-current flow to said gasoline; the velocity of said stream of gasoline being increased in its passage from the upper part of one chamber to the lower part of a succeeding chamber, wherein the gasoline flows upwardly through the contact material while meeting a downward flow of acid and acid-sludge, by the addition of a portion of the gasoline carrying acid-sludge in a constant ratio of gasoline to acid-sludge passed from the lower part of said succeeding chamber to the upper part of said first chamber wherein said acid-sludge is separated from said carrying gasoline to descend by gravity through the contact material in said first chamber.

8. In the process of refining hydrocarbon oils with sulphuric acid wherein the acid is passed downwardly through a chamber substantially filled with contact material having relatively free drainage, the oil is simultaneously passed upwardly therethrough, and the resulting drained acid sludge is removed from the chamber at a rate sufficient to prevent substantial accumulation therein, that step which comprises: flowing the oil upwardly through said contact material wet with the acid in said chamber but through no substantial body of the acid in said chamber.

9. In the process of refining hydrocarbon oils with sulphuric acid wherein a stream of oil is passed through successive chambers each substantially filled with contact material having relatively free drainage, sulphuric acid and acid-sludge is passed through said chambers in counter-current flow to said oil, and acid-sludge is removed from the lower part of each chamber, that step which comprises: continuously cycling a secondary stream of oil from the lower part of one chamber to the upper part of a second chamber thence back to the lower part of the first chamber at a velocity sufficiently great enough to remove acid-sludge and prevent substantial accumulation of the drained acid-sludge in the first chamber.

10. In the process of refining hydrocarbon oils with sulphuric acid wherein a stream of oil is passed through successive chambers each substantially filled with contact material having relatively free drainage, sulphuric acid and acid-sludge is passed through said chambers in counter-current flow to said oil, and acid-sludge is removed from the lower part of each chamber, that step which comprises: continuously cycling a secondary stream of oil from the lower part of one chamber to the upper part of a second chamber thence back to the lower part of the first chamber at a velocity sufficiently great enough to remove acid-sludge and prevent substantial accumulation of the drained acid-sludge in the first chamber while locally decreasing such velocity in the upper part of said second chamber sufficient to cause separation of the acid-sludge from said secondary stream to be deposited on the contact material in said upper part.

DAVID DEWEY STARK.
THOMAS OLIVER EDWARDS, Jr.